(12) United States Patent
Chen et al.

(10) Patent No.: US 10,880,839 B2
(45) Date of Patent: Dec. 29, 2020

(54) POWER CONTROL METHOD AND LINK AND RELATED PRODUCT

(71) Applicant: GUANGDONG OPPO MOBILE TELECOMMUNICATIONS CORP., LTD., Guangdong (CN)

(72) Inventors: Wenhong Chen, Dongguan (CN); Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/621,685

(22) PCT Filed: Jun. 16, 2017

(86) PCT No.: PCT/CN2017/088606
§ 371 (c)(1),
(2) Date: Dec. 11, 2019

(87) PCT Pub. No.: WO2018/227541
PCT Pub. Date: Dec. 20, 2018

(65) Prior Publication Data
US 2020/0128487 A1    Apr. 23, 2020

(51) Int. Cl.
*H04W 52/14* (2009.01)
*H04W 52/24* (2009.01)

(52) U.S. Cl.
CPC ....... *H04W 52/146* (2013.01); *H04W 52/242* (2013.01)

(58) Field of Classification Search
CPC . H04W 52/14; H04W 52/146; H04W 52/241; H04W 52/242; H04W 52/243
See application file for complete search history.

(56) References Cited

U.S. PATENT DOCUMENTS 6,708,041 B1 * 3/2004 Butovitsch ............ H04W 52/50
                                                                455/522
7,813,323 B1 * 10/2010 Talley ................... H04L 1/0021
                                                                370/335

(Continued)

FOREIGN PATENT DOCUMENTS

CN    101132203 A    2/2008
CN    101359936 A    2/2009

(Continued)

OTHER PUBLICATIONS

International Search Report in the international application No. PCT/CN2017/088606, dated Feb. 24, 2018.

(Continued)

*Primary Examiner* — Dominic E Rego
(74) *Attorney, Agent, or Firm* — Ladas & Parry, LLP

(57) ABSTRACT

The embodiments provide a power control method for a link, which includes that: User Equipment (UE) receives a message from a network side, the message containing adjustment information for instructing the UE to adjust uplink transmit power; the UE analyzes the message to acquire the adjustment information, and extracts a adjustment strategy associated with the adjustment information according to the adjustment information; and the UE adjusts the uplink transmit power according to the adjustment strategy. The embodiments have the advantage of improving power adjustment efficiency.

18 Claims, 7 Drawing Sheets

(56) References Cited

U.S. PATENT DOCUMENTS

| | | | |
|---|---|---|---|
| 2002/0080719 A1* | 6/2002 | Parkvall | H04L 1/1825 370/235 |
| 2003/0045318 A1* | 3/2003 | Subrahmanya | H04W 52/40 455/522 |
| 2005/0003846 A1* | 1/2005 | Anderson | H04W 52/228 455/522 |
| 2005/0143116 A1* | 6/2005 | Hsu | H04W 52/12 455/522 |
| 2006/0035660 A1* | 2/2006 | Anderson | H04W 52/06 455/522 |
| 2006/0174179 A1* | 8/2006 | Visvanathan | H04W 52/12 714/758 |
| 2007/0082620 A1* | 4/2007 | Zhang | H04W 52/40 455/69 |
| 2007/0281728 A1* | 12/2007 | Charriere | H04W 52/286 455/522 |
| 2008/0069062 A1* | 3/2008 | Li | H04W 52/265 370/338 |
| 2008/0200202 A1* | 8/2008 | Montojo | H04W 52/262 455/522 |
| 2010/0167771 A1* | 7/2010 | Raghothaman | H04B 17/318 455/501 |
| 2010/0309833 A1* | 12/2010 | Liu | H04W 52/12 370/311 |
| 2010/0323744 A1* | 12/2010 | Kim | H04W 52/247 455/522 |
| 2011/0014875 A1* | 1/2011 | Chao | H04W 52/12 455/63.1 |
| 2011/0070919 A1 | 3/2011 | Komine | |
| 2011/0243087 A1* | 10/2011 | Ahn | H04W 52/146 370/329 |
| 2011/0267994 A1* | 11/2011 | Pan | H04L 5/14 370/280 |
| 2013/0095869 A1* | 4/2013 | Christoffersson | H04B 1/40 455/501 |
| 2013/0188473 A1* | 7/2013 | Dinan | H04W 56/00 370/216 |
| 2013/0225226 A1 | 8/2013 | Manssour | |
| 2014/0098726 A1* | 4/2014 | Kang | H04W 52/545 370/311 |
| 2014/0112179 A1* | 4/2014 | Muraoka | H04W 52/242 370/252 |
| 2014/0177500 A1* | 6/2014 | Han | H04W 52/36 370/311 |
| 2014/0198736 A1* | 7/2014 | Shukair | H04W 52/383 370/329 |
| 2014/0029551 A1 | 11/2014 | Ryoo et al. | |
| 2015/0005027 A1 | 1/2015 | Zeng et al. | |
| 2015/0133179 A1* | 5/2015 | Li | H04W 52/146 455/522 |
| 2015/0341867 A1* | 11/2015 | Lou | H04W 72/082 370/329 |
| 2016/0049997 A1* | 2/2016 | Onodera | H04W 76/10 370/329 |
| 2016/0050631 A1* | 2/2016 | Wen | H04W 52/242 455/522 |
| 2016/0174160 A1 | 6/2016 | Shen | |
| 2016/0323835 A1 | 11/2016 | Chen et al. | |
| 2017/0026912 A1* | 1/2017 | Lee | H04W 52/367 |
| 2017/0164298 A1 | 6/2017 | Ryoo et al. | |
| 2017/0195974 A1* | 7/2017 | Huang | H04W 64/00 |
| 2017/0223674 A1* | 8/2017 | Dinan | H04L 1/1861 |
| 2017/0272199 A1* | 9/2017 | Dinan | H04W 72/042 |
| 2017/0374624 A1* | 12/2017 | Ahn | H04W 52/58 |
| 2018/0035459 A1* | 2/2018 | Islam | H04W 74/04 |
| 2018/0132245 A1* | 5/2018 | Yerramalli | H04W 72/042 |
| 2018/0213485 A1* | 7/2018 | Sundararajan | H04W 52/146 |
| 2020/0107271 A1* | 4/2020 | Anderson | H04W 52/241 |

FOREIGN PATENT DOCUMENTS

| | | |
|---|---|---|
| CN | 101557246 A | 10/2009 |
| CN | 101674613 A | 3/2010 |
| CN | 102281621 A | 12/2011 |
| CN | 103327595 A | 9/2013 |
| CN | 103369654 A | 10/2013 |
| CN | 104244389 A | 12/2014 |
| CN | 104349441 A | 2/2015 |
| CN | 104509180 A | 4/2015 |
| CN | 104754676 A | 7/2015 |
| RU | 2582598 C2 | 4/2016 |
| WO | 2006015983 A1 | 2/2006 |
| WO | 2012060746 A1 | 5/2012 |
| WO | 2013127278 A1 | 9/2013 |

OTHER PUBLICATIONS

Written Opinion of the international Search Authority in the international application No. PCT/2017/088606, dated Feb. 24, 2018.
3rd Generation Partnership Project;Technical Specification Group Radio Access Network;Evolved Universal Terrestrial Radio Access (E-UTRA);Physical layer procedures(Release 9), dated Sep. 2010;TS 36.213 V9.3.0.
Supplementary European Search Report in the European application No. 17913470.5, dated Apr. 21, 2020.
First Office Action of the Chinese application No. 201780089936.8, dated Jun. 12, 2020.
Nokia. "UL Power Control for MIMO", 3GPP TSG RAN WG1 Meeting #89 R1-1708220, issued on May 19, 2017, sections 1-5.
English translation of the Written Opinion of the International Search Authority in the international application No. PCT/CN2017/088606, dated Feb. 24, 2018.
Notice of Allowance of the Chinese application No. 201780089936.8, dated Oct. 12, 2020.
Second Office Action of the Chinese application No. 201780089936.8, dated Aug. 20, 2020.
First Office Action of the European application No. 17913470.5, dated Sep. 24, 2020.
First Office Action of the Russian application No. 2019143960, dated Aug. 6, 2020.

* cited by examiner

POWER CONTROL METHOD AND LINK AND RELATED PRODUCT

CROSS-REFERENCE TO RELATED APPLICATION

This application is the U.S. national phase of PCT/CN2017/028606, filed on Jun. 16, 2017, the disclosure of which is incorporated by reference herein in their entireties.

TECHNICAL FIELD

The disclosure relates to the technical field of communications, and more particularly to a power control method for a link and a related product.

BACKGROUND

In a communication system, an important characteristic of uplink power control is that pathloss is estimated based on a downlink signal and then uplink power control is performed based on the estimated pathloss. For improving the power control performance, power control may further be performed through a Transmit Power Control (TPC) command, namely uplink transmit power may be adjusted through a TPC command in Downlink Control Information (DCI).

5th-Generation (5G) New Radio (NR) is a subject raised recently by the 3rd Generation Partnership Project (3GPP). For 5G, uplink and downlink directions are greatly different and, consequently, uplink and downlink pathloss is greatly different, resulting in that adjustment cannot be achieved by controlling uplink power based on a downlink signal and efficiency is low.

SUMMARY

Embodiments of the disclosure provide a power control method for a link and a related product, to adjust uplink power and improve power adjustment efficiency.

According to a first aspect, the embodiments of the disclosure provide a power control method for a link, which may include that: User Equipment (UE) receives a message from a network side, the message containing adjustment information for instructing the UE to adjust uplink transmit power; the UE analyzes the message to acquire the adjustment information, and extracts a adjustment strategy associated with the adjustment information according to the adjustment information; and the UE adjusts the uplink transmit power according to the adjustment strategy.

Optionally, the adjustment information may be one or any combination of an adjusted power value, a power adjustment range, a power adjustment list, initial received power, pathloss information and a pathloss coefficient.

Optionally, in a case that the adjustment information is the adjusted power value, the operation that the adjustment strategy associated with the adjustment information is extracted according to the adjustment information may be implemented as follows: a power control manner is determined according to the adjusted power value.

The operation that the UE adjusts the uplink transmit power according to the adjustment strategy may be implemented as follows: the UE controls the uplink transmit power of the UE according to the power adjustment list in the power control manner.

Optionally, the UE, responsive to determining to adjust the uplink transmit power according to an accumulated value of the adjusted power value, may adjust the uplink transmit power of the UE according to the accumulated value in the power control manner.

Optionally, the power adjustment list may be configured in a pre-configuration manner or the power adjustment list may be carried in the message.

Optionally, an interval between two adjacent power adjustment values in the power adjustment list may be an unequal interval.

Optionally, in a case that the adjustment information is the initial received power, the initial received power including first initial received power and second initial received power, the operation that the adjustment strategy associated with the adjustment information is extracted according to the adjustment information may be implemented as follows: the power control manner is determined according to the initial received power.

The operation that the UE adjusts the uplink transmit power according to the adjustment strategy may be implemented as follows: the UE acquires information of the UE, and calculates an uplink transmit power of the UE according to the information of the UE by use of the first initial received power or second initial received power corresponding to the information of the UE.

The information of the UE may be a type of the UE, a configuration of the UE or a service type of the UE.

Optionally, in a case that the adjustment information is the pathloss coefficient, the pathloss coefficient including a first pathloss coefficient and a second pathloss coefficient, the operation that the adjustment strategy associated with the adjustment information is extracted according to the adjustment information may be implemented as follows: the power control manner is determined according to the pathloss coefficient.

The operation that the UE adjusts the uplink transmit power according to the adjustment strategy may be implemented as follows: the UE acquires the information of the UE, and calculates the uplink transmit power of the UE according to the type by use of the first pathloss coefficient or second pathloss coefficient corresponding to the information of the UE.

The information of the UE may be the type of the UE, the configuration of the UE or the service type of the UE.

Optionally, the operation that the UE receives wire message of the network side may be implemented as follows.

The UE receives the pathloss coefficient contained in physical-layer broadcast information or system information from a network-side device.

Optionally, in a case that the adjustment information is the pathloss information, the operation that the adjustment strategy associated with the adjustment information is extracted according to the adjustment information may be implemented as follows: the power control manner is determined according to the pathloss information.

The operation that the UE adjusts the uplink transmit power according to the adjustment strategy may be implemented as follows: the UE determines a selected pathloss adjustment value for calculator of the transmit power according to the pathloss information, and calculates the transmit power according to the selected pathloss adjustment value.

Optionally, in a case that the pathloss information is a pathloss adjustment value list, the operation that the UE determines the selected pathloss adjustment value for calculation of the transmit power according to the pathloss information may be implemented as follows.

The UE selects a value from the pathloss adjustment value list as the selected pathloss adjustment value.

Optionally, the operation that the UE selects a value from the pathloss adjustment value list as the selected pathloss adjustment value may include the following operations.

The UE randomly selects a value from the pathloss adjustment value list as the selected pathloss adjustment value.

Or the UE extracts a value from the pathloss adjustment value list according to the information of the UE as the selected pathloss adjustment value.

The information of the UE may be the type of the UE, the configuration of the UE or the service type of the UE.

Optionally, in a case that the pathloss information is a pathloss adjustment value range, the operation that the UE determines the selected pathloss adjustment value for calculation of the transmit power according to the pathloss information may be implemented as follows.

The UE selects a value from the pathloss adjustment value range as the selected pathloss adjustment value.

Optionally, the operation that the UE selects a value from the pathloss adjustment value range as the selected pith loss adjustment value may include the following operations.

The UE randomly selects a value from the pathloss adjustment value range as the selected pathloss adjustment value.

Or the UE extracts a value from the pathloss adjustment value range according to the information of the UE as the selected pathloss adjustment value.

The information of the UE may be the type of the UE, the configuration of the UE or the service type of the UE.

A second aspect provides a power control device for a link, which may be configured in UE and includes: a receiving unit, configured to receive a message of a network side, the message containing adjustment information for instructing the UE to adjust uplink transmit power; and a processing unit, configured to analyze the message to acquire the adjustment information, extract a adjustment strategy associated with the adjustment information according to the adjustment information and adjust the uplink transmit power according to the adjustment strategy.

Optionally, the adjustment information may be one or any combination of an adjusted power value, a power adjustment range a power adjustment list, initial received power, path loss information and a pathloss coefficient.

Optionally, the processing unit any specifically be configured to, in a case that the adjustment information is the adjusted power value, determine a power control manner according to the adjusted power value and control the uplink transmit power of the UE according to the power adjustment list in the power control manner.

Optionally, the processing unit may specifically be configured to, responsive to determining to adjust the uplink transmit power according to an accumulated value of the adjusted power value, adjust the uplink transmit power of the UE according to the accumulated value in the power control manner.

Optionally, the power adjustment list may be configured in a pre-configuration manner or the power adjustment list may be contained in the message.

Optionally, an interval between two adjacent power adjustment values in the power adjustment list may be an unequal interval.

Optionally, the processing unit may further be configured to, in a case that the adjustment information is the initial received power, the initial received power including first initial received power and second initial received power, determine the power control manner according to the initial received power, acquire information of the UE and calculate an uplink transmit power of the UE according to the information of the UE by use of the first initial received power or second initial received power corresponding to the information of the UE.

The information of the UE may be a type of the UE, a configuration of the UE or a service type of the UE.

Optionally, the processing unit may further be configured to in a case that the adjustment information is the pathloss coefficient, the pathloss coefficient including a first pathloss coefficient and a second pathloss coefficient, determine the power control manner according to the pathloss coefficient, acquire the information of the UE and calculate the uplink transmit power of the UE according to the type by use of the first pathloss coefficient or second pathloss coefficient corresponding to the information of the UE.

The information of the UE may be the type of the UE, the configuration of the UE or the service type of the UE.

Optionally, the receiving unit may specifically be configured to receive the pathloss coefficient contained in physical-layer broadcast information or system information from a network-side device.

Optionally, the processing unit may be configured to, in a case that the adjustment information is the pathloss information, determine the power control manner according to the pathloss information, determine a selected pathloss adjustment value for calculation of the transmit power according to the pathloss information and calculate the transmit power according to the selected pathloss adjustment value.

Optionally, the processing unit may further be configured to, in a case that the pathloss information is a pathloss adjustment value list, select a value from the pathloss adjustment value list as the selected pathloss adjustment value.

Optionally, the processing unit may further be configured to randomly select a value from the pathloss adjustment value list as the selected pathloss adjustment value, or extract a value from the pathloss adjustment value list according to the information of the UE as the selected pathloss adjustment value.

The information of the UE may be the type of the UE, the configuration of the UE or the service type of the UE.

Optionally, the processing unit may further be configured to, in a case that the pathloss information is a pathloss adjustment value range, select, by the UE, a value from the pathloss adjustment value range a the selected pathloss adjustment value.

Optionally, the processing unit may further be configured to randomly select a value from the pathloss adjustment value range as the selected pathloss adjustment value, or extract a value from the pathloss adjustment value range according to the information of the UE as the selected pathloss adjustment value.

The information of the UE may be the type of the UE, the configuration of the UE or the service type of the UE.

A third aspect provides a terminal, which may include one or more processors, a memory, a transceiver and one or more programs. The one or more programs may be stored in the memory and configured to be executed by the one or more processors, and the programs may include instructions configured to execute the steps in the method provided in the first aspect.

A fourth aspect provides a computer-readable storage medium, which may store a computer program for electronic data exchange, the computer program enabling a computer to execute the method provided in the first aspect.

A fifth aspect provides a computer program product, which may include a non-transitory computer-readable storage medium including a computer program, the computer program being operated to enable a computer to execute the method provided in the first aspect.

From the above, it can be seen that, in the embodiments of the disclosure, the UE, after acquiring the message of the network side, analyzes the message to acquire the adjustment information in the message and extracts the adjustment strategy according to the adjustment information to adjust the uplink transmit power, so that the advantages of adjusting the transmit power and improving power adjustment efficiency are achieved.

BRIEF DESCRIPTION OF DRAWINGS

The drawings to be used for descriptions about the embodiments or a conventional art will be simply introduced below.

DETAILED DESCRIPTION

The technical solutions in the embodiments of the disclosure will be described below in combination with the drawings.

Figure 1:
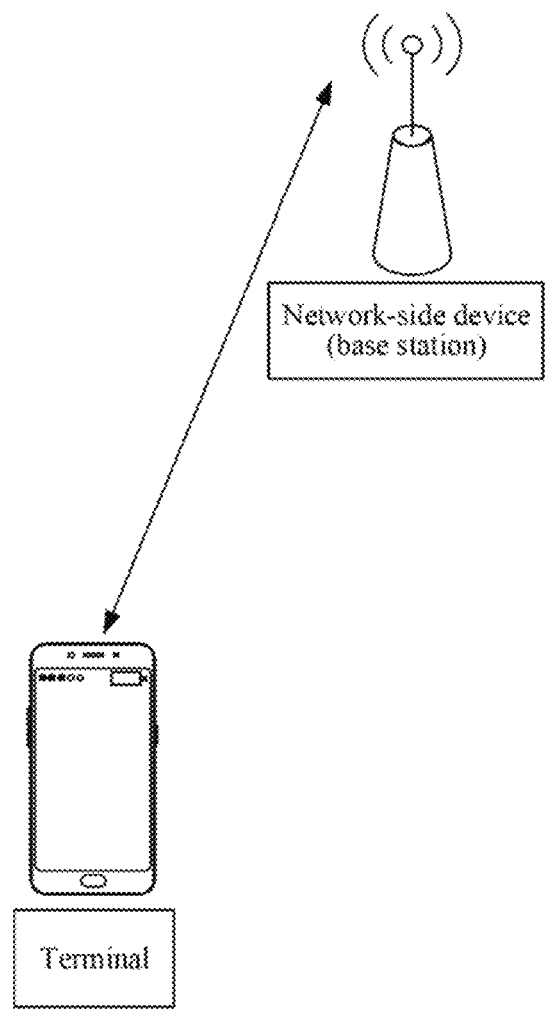
FIG. 1 is a structure diagram of an exemplary communication system.

Referring to FIG. 1, FIG. 1 is a possible network architecture of an exemplary communication system according to an embodiment of the disclosure. The exemplary communication system may be a 4th-Generation (4G) Long Term Evolution (LTE) communication system or a 5G NR communication system, and specifically may include a network-side device and a terminal. When the terminal accesses a mobile communication network provided by the network-side device, the terminal may form a communication connection with the network-side device through a wireless link. Such a communication connection may be a single connection or a dual connection or a multi-connection. When the communication connection is the single-connection, the network-side device may be an LTE base station or an NR base station (also called a gNB). When the communication is the dual-connection (which may specifically be implemented by a Carrier Aggregation (CA) technology or implemented by multiple network-side devices) and when the terminal is connected with multiple network-side devices, the multiple network-side devices include a Master Cell Group (MCG) and Secondary Cell Groups (SCGs), data are transmitted back between the cell groups through backhauls, the MCG may be an UE base station and the SCGs may be LTE base stations, or, the MCG may be an NR base station and the SCGs may be LTE base stations, or, the MCG may be an NR base station and the SCGs may be NR base stations.

In the embodiments of the disclosure, terms "network" and "system" are often used alternately and their meanings may be understood by those skilled in the art. A terminal involved in the embodiments of the disclosure may include various handheld devices, vehicle-mounted devices, wearable devices, computing devices or other processing devices connectable to wireless modems, which have a wireless communication function, as well as UE, Mobile Stations (MSs), terminal devices and the like in various forms. For convenient description, the devices mentioned above are collectively referred to as terminals.

Figure 2:
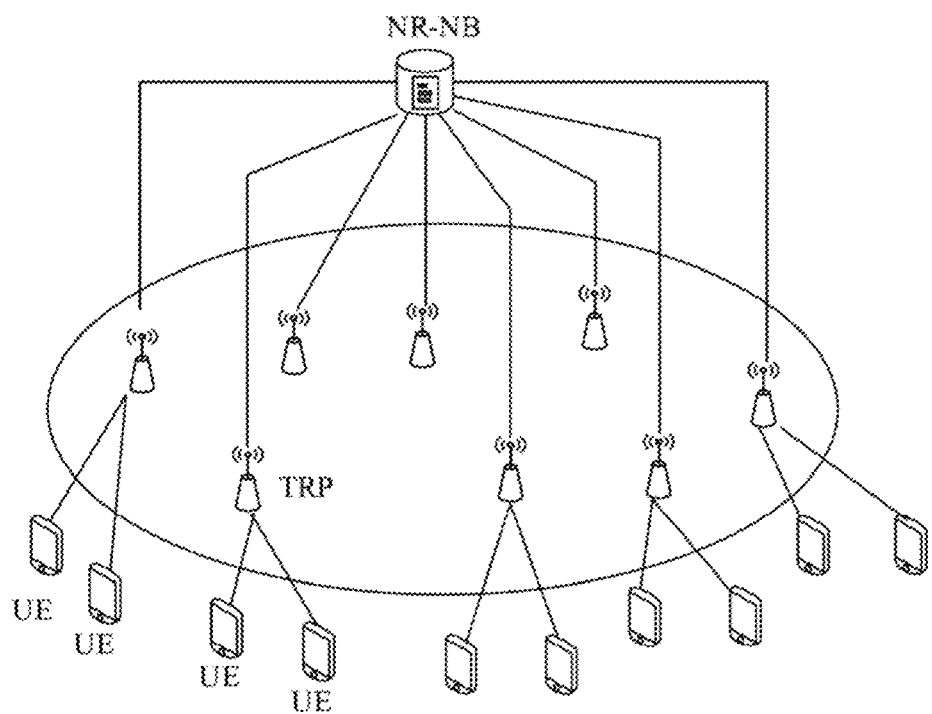
FIG. 2 is a structure diagram of an exemplary NR communication system.

Referring to FIG. 2, FIG. 2 is a structure diagram of a 5G NR network. As shown in FIG. 2, one or more Transmission Reception Points (TRPs) may exist under an NR-NB, and one or more UEs may exist within a range of the one or more TRPs. For the NR system shown in FIG. 2, since multiple TRPs may exist under the NR-NB, downlink data of UE may be transmitted through a TRP under the NR-NB, while uplink data may be transmitted through a second TRP under the NR-NB. According to this technical solution, downlink and uplink data are transmitted through different TRPs, and transmitting the data through different TRPs may make uplink pathloss and downlink pathloss greatly different, so that uplink transmit power has to be controlled for many times according to a downlink signal, and thus the efficiency is low. In addition, for the NR system, introduction of a multiple beam technology makes uplink and downlink directions greatly different, and uplink or downlink data are transmitted or received through antennae in different directions to make uplink and downlink pathloss greatly different, resulting in the uplink transmit power has to be controlled for many times according to the downlink signal, and the efficiency is low.

Figure 3:
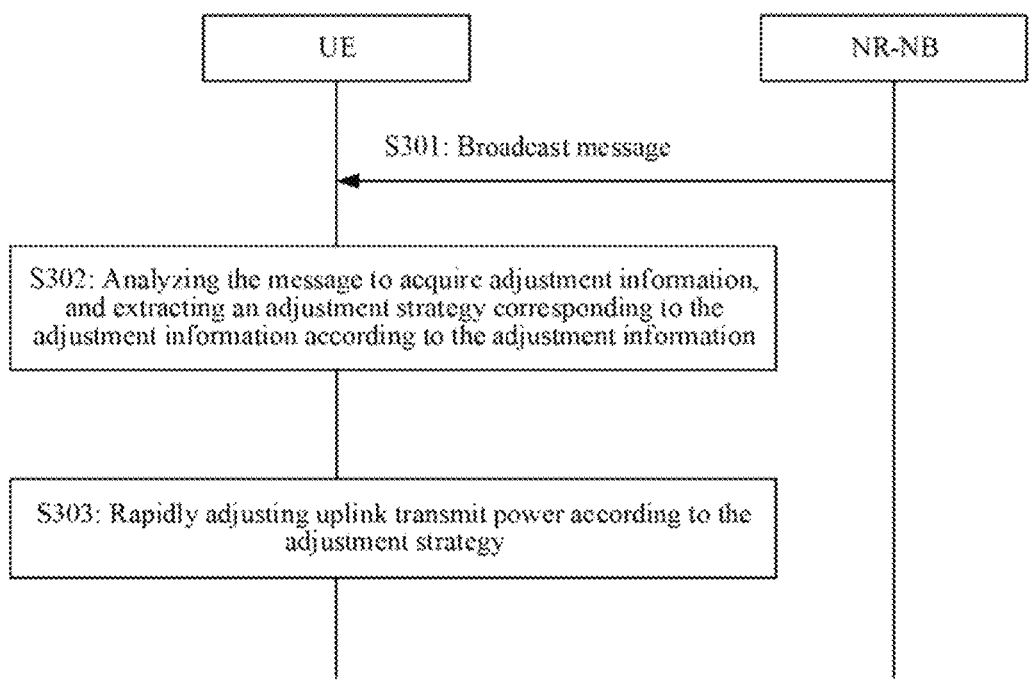
FIG. 3 is a schematic diagram of a power control method for a link according to an embodiment of the disclosure.

Referring to FIG. 3, FIG. 3 illustrates a power control method for a link. The method is executable by UE. The method is implemented in a 5G NR network structure shown in FIG. 2. As shown in FIG. 3, the method includes the following operations.

In the operation S301, the UE receives a message from a network side, the message containing adjustment information for instructing the UE to adjust uplink transmit power.

In the operation S301, the UE may receive the message from the network side in many ways. For example, in a preferred embodiment of the embodiments, a network-side device, for example, a TRP, may broadcast the message via broadcasting, and the UE receives the message broadcast by the TRP. Of course, during a practical application, unicast may also be adopted for transmission. Specific implementation modes of the disclosure are not limited to such specific forms for transmitting the message.

The message in the operation S301 may specifically be a type of DCI, and specifically may be a Random Access Response (RAR), a Radio Resource Control (RRC) message or a Media Access Control (MAC) Control Element (CE). Of course, during the practical application, it may also be other DCI. A specific format of the DCI is not limited in the specific implementation modes of the disclosure.

The adjustment information in the operation S301 may specifically be one or any combination of: an adjusted power value, a power adjustment range, a power adjustment list, initial received power, a pathloss coefficient or pathloss information.

The message may be one message, or may also be multiple messages. When there are multiple messages, the adjustment information may be transmitted to the UE through the multiple messages.

In the operation S302, the UE analyzes the message to acquire the adjustment information, and the UE extracts a adjustment strategy associated with the adjustment information according to the adjustment information.

The adjustment strategy in the operation S302 may specifically be open-loop power control or closed-loop power control. Of course, during the practical application, the open-loop power control combined with the closed-loop power control may also be adopted for adjustment. The adjustment strategy is not limited in the disclosure.

In the operation S303, the UE adjusts the uplink transmit power according to the adjustment strategy.

In the technical solution provided in the embodiment of the disclosure, the UE, after acquiring the message from the network side, analyzes the message to acquire the adjustment information in the message and extracts the adjustment strategy according to the adjustment information to adjust the uplink transmit power, so that the advantages of adjusting the transmit power and improving power adjustment efficiency are achieved.

Figure 3A:
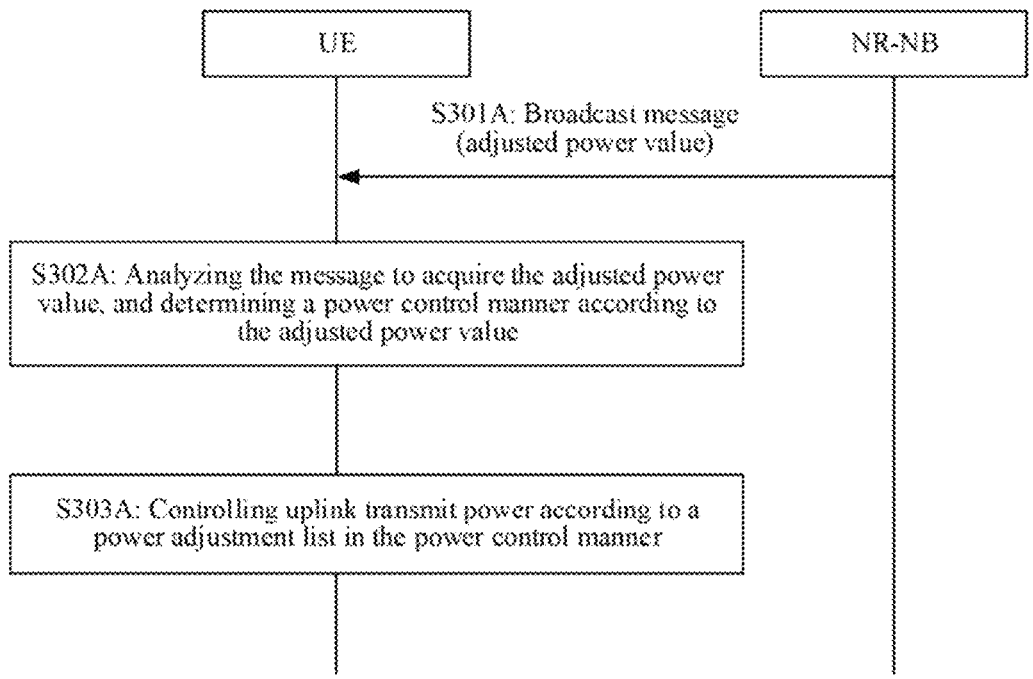
FIG. 3A is a schematic diagram of a power control method for a link according to another embodiment of the disclosure.

Referring to FIG. 3A, FIG. 3A illustrates a power control method for a link. The method is executable by UE. The method is implemented in a 5G NR network structure shown in FIG. 2. As shown in FIG. 3A, the method includes the following operations.

In the operation S301A, the UE receives a message broadcast by an NR-NB, the message containing an adjusted power value for instructing the UE to adjust uplink transmit power.

In the operation S302A, the UE analyzes the message to acquire the adjusted power value, and the UE determines a power control manner according to the adjusted power value.

The adjusted power value in the operation S302A may be a power value for single power adjustment.

In the operation S303A, the UE controls the uplink transmit power of the UE by using the power control manner and according to a power adjustment list.

The power control manner may specifically be one of: an open-loop power control manner, a closed-loop power control manner or a combination of the open-loop power control manner and the closed-loop power control manner.

Referring to Table 1, Table 1 is a power adjustment list.

TABLE 1

| TPC Command | Value (in dB) |
|---|---|
| 0 | −6 |
| 1 | −4 |
| 2 | −2 |
| 3 | 0 |
| 4 | 2 |
| 5 | 4 |

TABLE 1-continued

| TPC Command | Value (in dB) |
|---|---|
| 6 | 6 |
| 7 | 8 |

Referring to Table 2, Table 2 is another power adjustment list. An interval between two adjacent power adjustment values in the power adjustment list is an equal interval, and a value of the interval is 3 dB.

TABLE 2

| TPC Command | Value (in dB) |
|---|---|
| 0 | −9 |
| 1 | −6 |
| 2 | −3 |
| 3 | 0 |
| 4 | 3 |
| 5 | 6 |
| 6 | 9 |
| 7 | 12 |

Referring to Table 3, Table 3 is another power adjustment list. An interval between two adjacent power adjustment values in the power adjustment list is an unequal interval.

TABLE 3

| TPC Command | Value (in dB) |
|---|---|
| 0 | −6 |
| 1 | −4 |
| 2 | −2 |
| 3 | 0 |
| 4 | 2 |
| 5 | 4 |
| 6 | 7 |
| 7 | 11 |

Referring to Table 4, Table 4 is another power adjustment list. For Table 4, the number of bits occupied by required TPC is 4, namely there are 16 corresponding power adjustment values.

TABLE 4

| TPC Command | Value (in dB) |
|---|---|
| 0 | −14 |
| 1 | −12 |
| 2 | −10 |
| 3 | −8 |
| 4 | −6 |
| 5 | −4 |
| 6 | −2 |
| 7 | 0 |
| 8 | 2 |
| 9 | 4 |
| 10 | 6 |
| 11 | 8 |
| 12 | 10 |
| 13 | 12 |
| 14 | 14 |
| 15 | 16 |

Table 2, Table 3 and Table 4 may be pre-configured for the UE. Of course, during the practical application, Table 2, Table 3 and Table 4 may also be configured for the UE by an NR-NB through a broadcast message.

Optionally, after the operation S303, the method may further include the following operation.

Responsive to that the UE determines to adjust the uplink transmit power according to an accumulated value of the adjusted power value, the UE may adjust the uplink transmit power of the UE according to the accumulated value in the power control manner. The accumulated value of the adjusted power value may be acquired in many manners. In an optional implementation solution, a sum of adjusted power values contained in multiple messages may be the accumulated value.

The advantages of the embodiment shown in FIG. 3A will be described below with a practical example. Referring to FIG. 3A, in a case that the adjusted power value in S301A is 20 dB and the transmit power is increased by 20 dB according to the power adjustment list shown in Table 1 in the power control manner, the UE is required to perform adjustment at least for three times, and specifically, the UE is required to perform adjustment for three times in a manner of increase by 8 dB for the first time, increase by 8 dB for the second time and increase by 4 dB for the third time. According to the adjustment manner shown in Table 2, namely a power adjustment magnitude of each stage is increased, adjustment is required to be performed twice in a manner of increase by 12 dB for the first time and increase by 9 dB for the second time. According to the adjustment manner shown in Table 3, namely unequal power adjustment magnitudes are adopted for each stage, adjustment is also required to be performed for three times in a manner of increase by 11 dB for the first time, increase by 7 dB for the second time and increase by 2 dB for the third time. According to the adjustment manner shown in Table 4, adjustment is required to be performed twice in a manner of increase by 16 dB for the first time and increase by 4 dB for the second time. For most of power adjustment values, adjusting the transmit power in the power control manner may effectively reduce a power adjustment frequency, so that low frequency and high efficiency of transmit power adjustment are achieved.

Figure 3B:
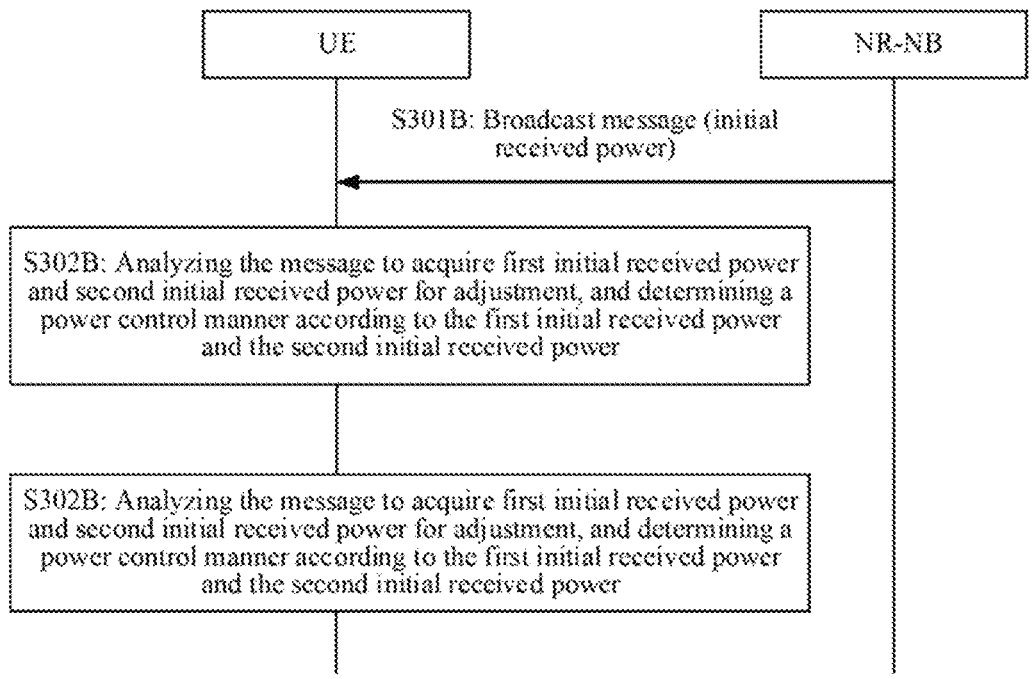
FIG. 3B is a schematic diagram of a power control method for a link according to another embodiment of the disclosure.

Referring to FIG. 3B. FIG. 3B illustrates a power control method for a link. The method is executable by UE. The method is implemented in a 5G NR network structure shown in FIG. 2. As shown in FIG. 3B, the method includes the following steps.

In the operation S301B, the UE receives a message broadcast by an NR-NB, the message containing first initial received power and second initial received power for instructing the UE to adjust uplink transmit power.

In the operation S302B, the UE analyzes the message to acquire the first initial received power and second initial received power for adjustment, and the UE determines a power control manner according to the first initial received power and the second initial received power.

In the operation S303B, the UE acquires information of the UE, and calculates an uplink transmit power of the UE according to the information and by use of the first initial received power or second initial received power corresponding to the information.

The information of the UE may specifically be one of: a type of UE, a service type of the UE, or a configuration of the UE.

The first initial received power and the second initial received power may respectively be represented as $P_0$-1 and $P_0$-2. A terminal type corresponding to the first initial received power $P_0$-1 may be a terminal for which beam correspondence is true, and a terminal type corresponding to the second initial received power $P_0$-2 may be a terminal for which the beam correspondence is not true. The uplink transmit power of the UE may specifically be:

$$P(i)=\min\{P_{CMAX}, g(P_0, \alpha^*PL, f(i))\},$$

where $P_{CMAX}$ is maximum transmit power of the UE, g is a function with multiple variables, specifically $g=P_0+\alpha^*PL+f(i)$, $P_0$ may be one of $P_0$-2 and $P_0$-1, $\alpha$ is a pathloss coefficient, PL is estimated pathloss, and f(i) is an adjusted value determined according to a TPC command.

Whether the beam correspondence is true or not true for the UE may specifically be determined in a way as follows: in a case that a direction (beam) of downlink data received by the UE is included within a direction (beam) of uplink data transmitted by the UE, it is determined that the beam correspondence is true for the UE, otherwise it is determined that the beam correspondence is not true for the UE. For example, in a case that the data receiving beam of the UE is a beam 1 and the data transmitting beam of the UE is the beam 1 and a beam 2, it is determined that the beam correspondence is true for the UE; and in a case that the data receiving beam of the UE is the beam 1 and the data transmuting beam of the UE is the beam 2, it is determined that the beam correspondence is not true for the UE.

According to the embodiment shown in FIG. 3B, initial received power values corresponding to two types of UE are broadcast through the message to enable the UE to automatically select an initial received power value suitable for itself according to the type of itself to calculate the uplink transmit power, thereby adjusting the transmit power.

Figure 3C:
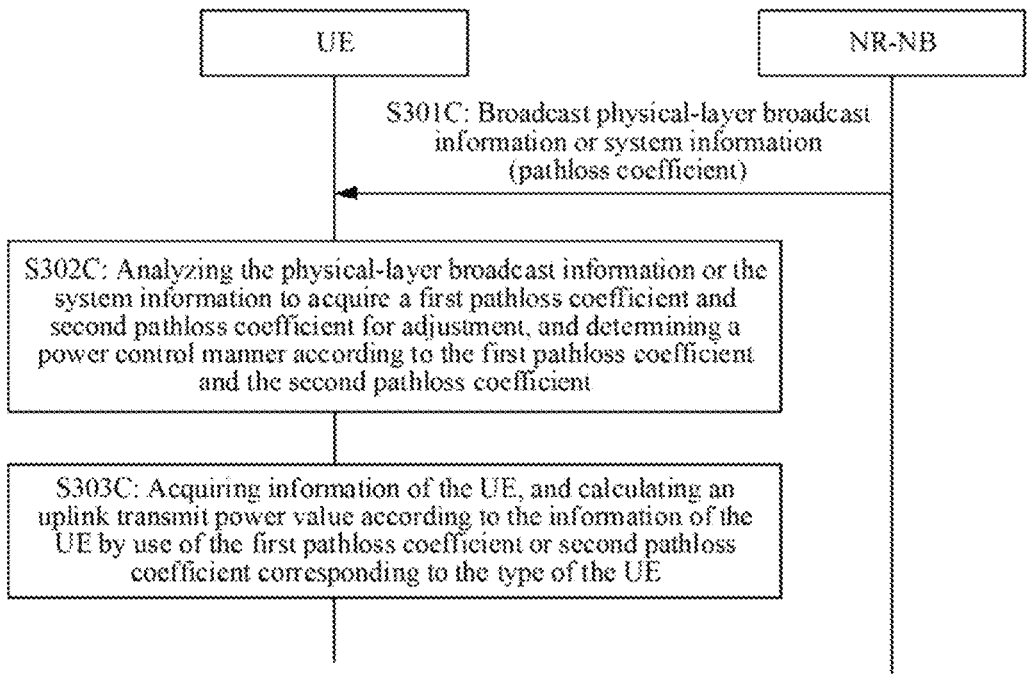
FIG. 3C is a schematic diagram of a power control method for a link according to another embodiment of the disclosure.

Referring to FIG. 3C, FIG. 3C illustrates a power control method for a link. The method is executable by UE. The method is implemented in a 5G NR network structure shown in FIG. 2. As shown in FIG. 3C, the method includes the following operations.

In the operation S301C, the UE receives physical-layer broadcast information or system information broadcast by an NR-NB, the physical-layer broadcast information or the system information containing a first pathloss coefficient and a second pathloss coefficient for instructing the UE to adjust uplink transmit power.

In the operation S302C, the UE analyzes the physical-layer broadcast information or the system information to acquire the first pathloss coefficient and second pathloss coefficient for adjustment, and the UE determines a power control manner according to the first pathloss coefficient and the second pathloss coefficient.

In the operation S303C, the UE acquires information of the UE, and calculates an uplink transmit power of the UE according to the type of the UE and by use of the first pathloss coefficient or second pathloss coefficient corresponding to the information of the UE.

The first pathloss coefficient and the second pathloss coefficient may respectively be represented as $\alpha 1$ and $\alpha 2$. A terminal type corresponding to the first pathloss coefficient $\alpha 1$ may be a terminal for which beam correspondence is true, and a terminal type corresponding to the second pathloss coefficient $\alpha 2$ may be a terminal for which the beam correspondence is not true. The uplink transmit power of the UE may specifically be:

$$P(i)=\min\{P_{CMAX}, g(P_0, \alpha^*PL, f(i))\},$$

where $P_{CMAX}$ is maximum transmit power of the UE, g is a function with multiple variables, specifically $g=P_0+\alpha^*PL+$ f(i), $P_0$ may be an initial received power value, α is one of α1 or α2, PL is estimated pathloss, and f(i) is an adjusted value determined according to a TPC command.

According to the embodiment shown in FIG. 3C, the pathloss coefficients corresponding to two types of UE are broadcast through the physical-layer broadcast information or the system information to enable the UE to automatically select the pathloss coefficient suitable for the type of the UE itself according to the type of itself to calculate the uplink transmit power, thereby adjusting the transmit power.

Figure 3D:
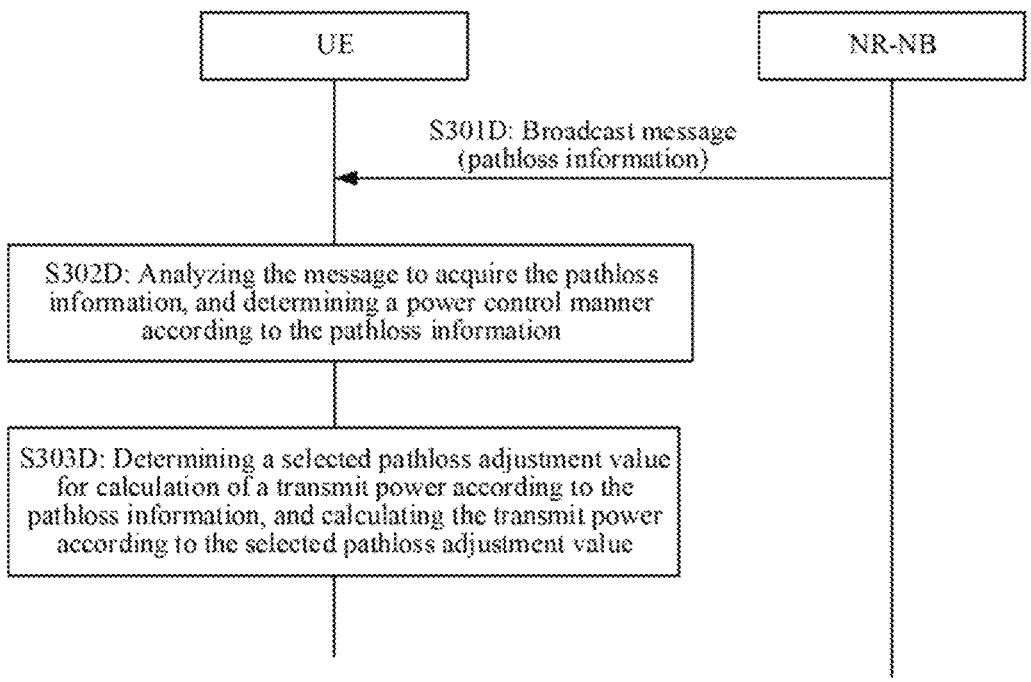
FIG. 3D is a schematic diagram of a power control method for a link according to a yet another embodiment of the disclosure.

Referring to FIG. 3D, FIG. 3D illustrates a power control method for a link. The method is executable by UE. The method is implemented in a 5G NR network structure shown in FIG. 2. As shown in FIG. 3D, the method includes the following operations.

In the operation S301D, the UE receives a message broadcast by an NR-NB, the message containing pathloss information for instructing the UE to adjust uplink transmit power.

In the operation S302D, the UE analyzes the message to acquire the pathloss information, and the UE determines a power control manner according to the pathloss information.

In the operation S303D, the UE determines a selected pathloss adjustment value for calculation of a transmit power according to the pathloss information, and calculates the transmit power according to the selected pathloss adjustment value.

$$P(f)=\min\{P_{CMAX}, g(P_0, \alpha *PL, f(i))\},$$

where $P_{CMAX}$ is maximum transmit power of the UE, g is a function with multiple variables, specifically $g=P_0+\alpha *(PL+\Delta)+f(i)$, $P_0$ may be an initial received power value, α is a pathloss coefficient, PL is estimated pathloss, Δ is the selected pathloss adjustment value, and f(i) is an adjusted value determined according to a TPC command.

Estimated pathloss information may be a specific pathloss value, for example, 10 dB. In a case that the pathloss information is a fixed value, the selected pathloss adjustment value is a fixed value. The estimated pathloss information may specifically be a pathloss adjustment value list. The UE may freely select a value from the pathloss adjustment value list as the selected pathloss adjustment value. Of course, the UE may also select a value from the pathloss adjustment value list according to the type of the UE as the selected pathloss adjustment value. The estimated pathloss information may also be a pathloss value range, and the range may be determined in many ways. For example, a specific value of the range may be contained in the message. Of course, a value in the range may also be contained in the message, and the UE determines the range according to the value. For example, in a case that a value in the range is 20 dB, the range may be determined to be [0, 20 dB]. In a case that a value in the range is −20 dB, the range may be determined to be [−20 dB, 0]. A selection manner may refer to a manner for determining the selected pathloss adjustment value from the pathloss adjustment value list, which will be not repeated.

According to the embodiment shown in FIG. 3D, the pathloss information is broadcast through the message to enable the UE to automatically select a suitable pathloss adjustment value according to the type thereof to calculate the uplink transmit power, thereby adjusting the transmit power.

Figure 4:
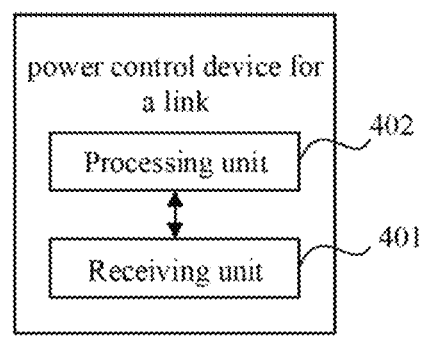
FIG. 4 is a composition block diagram of a functional unit of a terminal according to an embodiment of the disclosure.

Referring to FIG. 4, FIG. 4 is a structure diagram of a power control device for a link according to an embodiment of the disclosure. The power control device for a link is arranged in UE. Technical terms, detailed solutions and technical effects in the embodiment shown in FIG. 4 may refer to the descriptions in the embodiment shown in FIG. 3, FIG. 3A, FIG. 3B, FIG. 3C or FIG. 3D. The device includes a receiving unit 401 and a processing unit 402.

The receiving unit 401 is configured to receive a message from a network side, the message containing adjustment information for instructing the UE to adjust uplink transmit power.

The processing unit 402 is configured to analyze the message to acquire the adjustment information, extract a adjustment strategy associated with the adjustment information according to the adjustment information and adjust the uplink transmit power according to the adjustment strategy.

Optionally, the adjustment information is one or any combination of an adjusted power value, a power adjustment range, a power adjustment list, initial received power, pathloss information and a pathloss coefficient.

Optionally, the processing unit 402 is specifically configured to, in a case that the adjustment information is the adjusted power value, determine a power control manner according to the adjusted power value and control the uplink transmit power of the UE according to the power adjustment list in the power control manner.

Optionally, the power adjustment list is configured in a pre-configuration manner or the power adjustment list is carried in the message.

Optionally, the processing unit 402 is further configured to, in a case that the adjustment information is initial received power, the initial received power including first initial received power and second initial received power, determine the power control manner according to the initial received power, acquire information of the UE and calculate an uplink transmit power of the UE according to the information of the UE by use of the first initial received power or second initial received power corresponding to the type of the UE.

Optionally, the processing unit 402 is further configured to, in a case that the adjustment information is a pathloss coefficient, the pathloss coefficient including a first pathloss coefficient and a second pathloss coefficient, determine the power control manner according to the pathloss coefficient, acquire the information of the UE and calculate the uplink transmit power of the UE according to the type of the UE by use of the first pathloss coefficient or second pathloss coefficient corresponding to the type of the UE.

Optionally, the processing unit 402 is configured to, in a case that the adjustment information is pathloss information, determine the power control manner according to the pathloss information, determine a selected pathloss adjustment value for calculation of the transmit power according to the pathloss information and calculate the transmit power according to the selected pathloss adjustment value.

Optionally, the processing unit 402 is further configured to, in a case that the pathloss information is a pathloss adjustment value list, randomly select, by the UE, a value from the pathloss adjustment value list as the selected pathloss adjustment value, or extract, by the UE, a value from the pathloss adjustment value list according to the information of the UE as the selected pathloss adjustment value.

Optionally, the processing unit 402 is further configured to, in a case that the pathloss information is a pathloss adjustment value range, randomly select, by the UE, a value from the pathloss adjustment value range as the selected pathloss adjustment value, or extract, by the UE, a value from the pathloss adjustment value range according to the information of the UE as the selected pathloss adjustment value.

Figure 5:
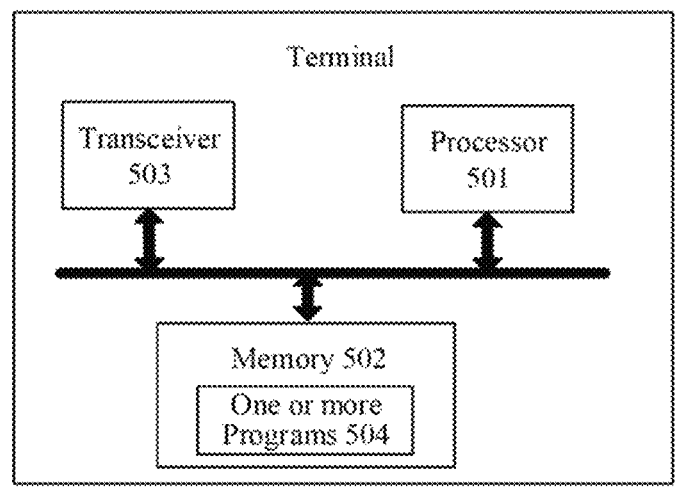
FIG. 5 is a hardware structure diagram of a terminal according to an embodiment of the disclosure.

An embodiment of the disclosure also provides a terminal, which, as shown in FIG. 5, includes one or more processors 501, a memory 502, a transceiver 503 and one or more programs 504. The one or mote programs may be stored in the memory 502 and configured to be executed by the one or more processors 501, and the programs may include instructions configured to execute the steps in the method provided in the embodiment shown in FIG. 3. FIG. 3A. FIG. 3B. FIG. 3C or FIG. 3D.

The processing unit 501 may be a processor or a controller, which may be, for example, a Central Processing Unit (CPU), a Digital Signal Processor (DSP), an Application Specific Integrated Circuit (ASIC), a Field-Programmable Gate Array (FPGA) or another programmable logical device, transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The transceiver 503 may be a communication interface or an antenna.

An embodiment of the disclosure also provides a computer-readable storage medium, which have stored a computer program configured for electronic data exchange, the computer program enabling a computer to execute the method provided in the embodiment shown in FIG. 3, FIG. 3A, FIG. 3B, FIG. 3C or FIG. 3D.

An embodiment of the disclosure also provides a computer program product. The computer program product includes a non-transitory computer-readable storage medium storing a computer program. The computer program may be operated to enable a computer to execute the method provided in the embodiment shown in FIG. 3, FIG. 3A, FIG. 3B, FIG. 3C or FIG. 3D.

The solutions of the embodiments of the disclosure are introduced mainly from the angle of interaction between each network element. It can be understood that, for realizing the functions, the terminal and the network-side device include corresponding hardware structures and or software modules for executing each function. Those skilled in the art may easily realize that the units and algorithm steps of each example described in combination with the embodiments in the disclosure may be implemented by hardware or a combination of the hardware and computer software in the disclosure. Whether a certain function is executed by hardware or in a manner of driving the hardware by the computer software depends on specific applications and design constraints of the technical solutions. Professionals may realize the described functions for each specific application by use of different methods, but such realization shall fall within the scope of the disclosure.

According to the embodiments of the disclosure, functional units of the terminal and the network-side device may be divided according to the abovementioned method examples. For example, each functional unit may be divided correspondingly to each function and two or more than two functions may also be integrated into a processing unit. The integrated unit may be implemented in a hardware form and may also be implemented in form of software program module. It is to be noted that division of the units in the embodiment of the disclosure is schematic and only logical function division and another division manner may be adopted during practical implementation.

Figure 6:
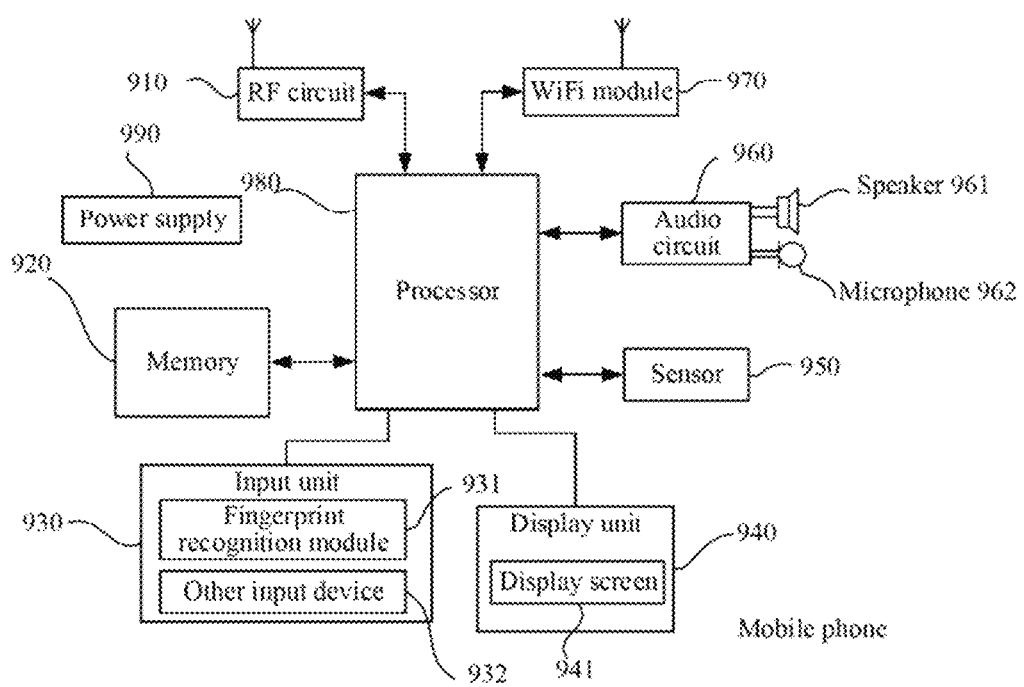
FIG. 6 is a structure diagram of another terminal according to an embodiment of the disclosure.

An embodiment of the disclosure also provides another terminal. As shown in FIG. 6, for convenient description, only parts related to the embodiment of the application are shown, and specific technical details which are undisclosed refer to pans of the method of the embodiments of the disclosure. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 6 is a block diagram of part of a structure of a mobile phone related to a terminal according to an embodiment of the disclosure. Referring to FIG. 6, the mobile phone includes components such as a Radio Frequency (RF) circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone shown in FIG. 6 is not intended to limit the mobile phone but may include components more or fewer than those shown in the figure or some components are combined or different component arrangements are adopted.

Each component of the mobile phone will be specifically introduced below in combination with FIG. 6.

The RF circuit 910 may be configured to receive and transmit information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and other device through wireless communication. Any communication standard or protocol may be adopted for wireless communication, including, but not limited to, a Global System of Mobile communication (GSM), a General Packet Radio Service (GPRS), Code Division Multiple Access (CDMA), Wideband Code Division Multiple Access (WCDMA), LTE, an electronic mail. Short Messaging Service (SMS) and the like.

The memory 920 may be configured to store a software program and a module. The processor 980 may operate the software program and module stored in the memory 920, thereby executing various function applications and data processing of the mobile phone. The memory 920 may mainly include a program storage region and a data storage region. The program storage region may store an operating system, an application program required by at least one function and the like. The data storage region may store data created based on the use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and another input device 932. The fingerprint recognition module 931 may acquire fingerprint data of a user thereon. Besides the fingerprint recognition module 931, the input unit 930 may further include another input device 932. Specifically, the another input device 932 may include, but not limited to, one or more of: a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. Optionally, the display screen 941 may be configured in form of Liquid Crystal Display (LCD) and Organic Light-Emitting Diode (OLED). In FIG. 6, the fingerprint recognition module 931 and the display screen 941 may realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and other sensors. Specifically, the light sensor may include an environmental light sensor and a proximity sensor. The environmental light sensor may adjust brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960 may include a speaker 961, and a microphone 962 may provide an audio interface between the user and the mobile phone. The audio circuit 960 may transmit an electric signal obtained by converting received audio data to the speaker 961, and the speaker 961 may convert it into a sound signal for playing. On the other hand, the microphone 962 may convert a collected sound signal into an electric signal, the audio circuit 960 may receive and convert it into audio data, and the audio data may be processed by the playing processor 980 and transmitted to for example, another mobile phone through the RF circuit 910, or the audio data are played to the memory 920 for further processing.

WiFi is a short-distance wireless transmission technology. The mobile phone may help the user through the WiFi module 970 to receive and transmit an electronic mail, browse a webpage, access streaming media and the like, and wireless wideband Internet access is provided for the user. Although the WiFi module 970 is shown in FIG. 6, it can be understood that it is not a necessary composition of the mobile phone and may completely be omitted according to a requirement without changing the scope of the essence of the disclosure.

The processor 980 is a control center of the mobile phone, and is for connecting each part of the whole mobile phone by use of various interfaces and lines and executing various functions and data processing of the mobile phone by running or executing the software program and/or module stored in the memory 920 and calling data stored in the memory 920, thereby monitoring the whole mobile phone. Optionally, the processor 980 may include one or more processing units. Preferably, the processor 980 may integrate an application processor and a modulation and demodulation processor. The application processor may mainly process the operating system, a user interface, an application program and the like. The modulation and demodulation processor may mainly process wireless communication. It can be understood that the modulation and demodulation processor may also not be integrated into the processor 980.

The mobile phone may further include the power supply 990 for supplying power to each part. Preferably, the power supply may be logically connected with the processor 980 through a power management system, thereby realizing functions of charging and discharging management, power consumption management and the like through the power management system.

Although not shown in the figure, the mobile phone may further include a camera, a Bluetooth module and the like, which will not be elaborated herein.

In the embodiment shown in FIG. 3, FIG. 3A, FIG. 3B, FIG. 3C or FIG. 3D, the flow on a terminal side in each step of the method may be implemented based on the structure of the mobile phone.

In the embodiment shown in FIG. 4, each functional unit may be implemented based on the structure of the mobile phone.

An embodiment of the disclosure also provides a computer-readable storage medium, which stores a computer program configured for electronic data exchange, the computer program enabling a computer to execute part or all of the steps executed by the terminal in, for example, the abovementioned method embodiments.

An embodiment of the disclosure also provides a computer program product. The computer program product includes a non-transitory computer-readable storage medium storing a computer program. The computer program may be operated to enable a computer to execute part or all of the steps executed by the terminal in, for example, the abovementioned method embodiments. The computer program product may be a software installation package.

The steps of the method or algorithm described in the embodiments of the disclosure may be implemented in a hardware manner, and may also be implemented m a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or pan of the functions described in the embodiments of the disclosure may be realized through software, hardware or any combination thereof. During implementation with the software, the embodiments may be implemented completely or partially in form of computer program product wire computer program product includes one or more computer instructions.

When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the specific implementation mode of the embodiments of the disclosure and not intended to limit the scope of protection of the embodiments of the disclosure. Any modifications, equivalent replacements, improvements and the like made based on the technical solutions of the embodiments of the disclosure shall fall within the scope of protection of the embodiments of the disclosure.

The invention claimed is:

1. A power control method for a link, comprising:
   receiving, by User Equipment (UE), a message from a network side, the message containing adjustment information for instructing the UE to adjust uplink transmit power;
   analyzing, by the UE, the message to acquire the adjustment information, and extracting an adjustment strategy associated with the adjustment information according to the adjustment information; and
   adjusting, by the UE, the uplink transmit power according to the adjustment strategy;
   wherein in a case that the adjustment information comprises an adjusted power value, extracting the adjustment strategy associated with the adjustment information according to the adjustment information is implemented as follows:
      determining a power control manner according to the adjusted power value; and
      adjusting, by the UE, the uplink transmit power according to the adjustment strategy is implemented as follows:
         controlling, by the UE, the uplink transmit power of the UE according to the power adjustment list in the power control manner.

2. The method of claim 1, wherein the adjustment information is one or any combination of:
   an adjusted power value, a power adjustment range, a power adjustment list, initial received power, pathloss information and a pathloss coefficient.

3. The method of claim 1, wherein the power adjustment list is configured in a pre-configuration manner or the power adjustment list is carried in the message.

4. The method of claim 1, wherein
   in a case that the adjustment information further comprises a pathloss coefficient, the pathloss coefficient comprising a first pathloss coefficient and a second pathloss coefficient, extracting the adjustment strategy associated with the adjustment information according to the adjustment information is implemented as follows: determining the power control manner according to the pathloss coefficient; and
   adjusting, by the UE, the uplink transmit power according to the adjustment strategy is implemented as follows: acquiring, by the UE, information of the UE, and calculating the uplink transmit power of the UE according to a type of the UE by use of the first pathloss coefficient or second pathloss coefficient corresponding to the information of the UE,
   the information of the UE being the type of the UE, a configuration of the UE or a service type of the UE.

5. The method of claim 1, wherein
   in a case that the adjustment information further comprises pathloss information, extracting the adjustment strategy associated with the adjustment information according to the adjustment information is implemented as follows:
      determining the power control manner according to the pathloss information; and
   adjusting, by the UE, the uplink transmit power according to the adjustment strategy is implemented as follows:
      determining, by the UE, a selected pathloss adjustment value for calculation of a transmit power according to the pathloss information, and calculating the transmit power according to the selected pathloss adjustment value.

6. The method of claim 5, wherein in a case that the pathloss information is a pathloss adjustment value list, determining, by the UE, the selected pathloss adjustment value for calculation of the transmit power according to the pathloss information is implemented as follows:
   selecting, by the UE, a value from the pathloss adjustment value list as the selected pathloss adjustment value.

7. The method of claim 5, wherein in a case that the pathloss information is a pathloss adjustment value range, determining, by the UE, the selected pathloss adjustment value for calculation of the transmit power according to the pathloss information is implemented as follows:
   selecting, by the UE, a value from the pathloss adjustment value range as the selected pathloss adjustment value.

8. A power control device for a link, arranged in User Equipment (UE) and comprising a processor and a transceiver connected with the processor, wherein the processor is configured to:
   control the transceiver to receive a message from a network side, the message containing adjustment information for instructing the UE to adjust uplink transmit power; and
   analyze the message to acquire the adjustment information, extract an adjustment strategy associated with the adjustment information according to the adjustment information and adjust the uplink transmit power according to the adjustment strategy;
   wherein the processor is configured to, in a case that the adjustment information comprises an adjusted power value, determine a power control manner according to the adjusted power value and control the uplink transmit power of the UE according to the power adjustment list in the power control manner.

9. The device of claim 8, wherein the adjustment information is one or any combination of:

an adjusted power value, a power adjustment range, a power adjustment list, initial received power, pathloss information and a pathloss coefficient.

10. The device of claim 8, wherein the processor is configured to, responsive to determining to adjust the uplink transmit power according to an accumulated value of the adjusted power value, adjust the uplink transmit power of the UE according to the accumulated value in the power control manner.

11. The device of claim 8, wherein the processor is further configured to, in a case that the adjustment information further comprises initial received power, the initial received power comprising first initial received power and second initial received power, determine the power control manner according to the initial received power, control the transceiver to acquire information of the UE, and calculate an uplink transmit power of the UE according to the information of the UE by use of the first initial received power or second initial received power corresponding to the information of the UE, the information of the UE being a type of the UE, a configuration of the UE or a service type of the UE.

12. The device of claim 8, wherein the processor is further configured to, in a case that the adjustment information further comprises a pathloss coefficient, the pathloss coefficient comprising a first pathloss coefficient and a second pathloss coefficient, determine the power control manner according to the pathloss coefficient, control the transceiver to acquire the information of the UE, and calculate the uplink transmit power of the UE according to a type of the UE by use of the first pathloss coefficient or second pathloss coefficient corresponding to the information of the UE, the information of the UE being the type of the UE, a configuration of the UE or a service type of the UE.

13. The device of claim 12, wherein the transceiver is configured to receive the pathloss coefficient contained in physical-layer broadcast information or system information from a network-side device.

14. The device of claim 8, wherein the processor is configured to, in a case that the adjustment information further comprises pathloss information, determine the power control manner according to the pathloss information, determine a selected pathloss adjustment value for calculation of a transmit power according to the pathloss information and calculate the transmit power according to the selected pathloss adjustment value.

15. The device of claim 14, wherein the processor is further configured to, in a case that the pathloss information is a pathloss adjustment value list, select a value from the pathloss adjustment value list as the selected pathloss adjustment value.

16. The device of claim 15, wherein the processor is further configured to randomly select a value from the pathloss adjustment value list as the selected pathloss adjustment value, or extract a value from the pathloss adjustment value list according to information of the UE as the selected pathloss adjustment value, the information of the UE being a type of the UE, a configuration of the UE or a service type of the UE.

17. The device of claim 14, wherein the processor is further configured to, in a case that the pathloss information is a pathloss adjustment value range, select, by the UE, a value from the pathloss adjustment value range as the selected pathloss adjustment value.

18. The device of claim 17, wherein the processor is further configured to randomly select a value from the pathloss adjustment value range as the selected pathloss adjustment value, or extract a value from the pathloss adjustment value range according to information of the UE as the selected pathloss adjustment value, the information of the UE being a type of the UE, a configuration of the UE or a service type of the UE.

* * * * *